United States Patent [19]

Ando

[11] Patent Number: 4,890,272
[45] Date of Patent: Dec. 26, 1989

[54] APPARATUS FOR CORRECTING PHOTODETECTOR SIGNALS IN A SYSTEM FOR RETRIEVING INFORMATION FROM AN OPTICAL RECORDING MEDIUM

[75] Inventor: Hideo Ando, Kawasaki, Japan

[73] Assignee: Kabushiki Kaisha Toshiba, Kawasaki, Japan

[21] Appl. No.: 273,750

[22] Filed: Nov. 16, 1988

Related U.S. Application Data

[63] Continuation of Ser. No. 18,489, Feb. 25, 1987, abandoned.

[30] Foreign Application Priority Data

Apr. 30, 1986 [JP] Japan .................................. 61-42915
Apr. 30, 1986 [JP] Japan ................................ 61-100746

[51] Int. Cl.$^4$ .............................................. G11B 7/00
[52] U.S. Cl. ......................................... 369/45; 369/46; 369/107; 369/116
[58] Field of Search ............... 346/76 L; 369/43–47, 369/53, 54, 107, 116, 124, 128, 134, 106, 107; 358/342; 250/201 DF

[56] References Cited

U.S. PATENT DOCUMENTS

| 4,150,402 | 4/1979 | Tietze et al. ................. 369/106 X |
| 4,283,785 | 8/1981 | Miyauchi et al. ............. 369/106 X |
| 4,516,235 | 5/1985 | Tarzaiski ......................... 369/116 |
| 4,538,257 | 8/1985 | Klinger .......................... 369/54 X |
| 4,648,085 | 3/1987 | Shimonou ......................... 369/54 |
| 4,682,315 | 7/1987 | Uejima .............................. 369/45 |

Primary Examiner—Robert L. Richardson
Attorney, Agent, or Firm—Finnegan, Henderson, Farabow, Garrett and Dunner

[57] ABSTRACT

A system capable of retrieving, recording or erasing information from an optical recording medium such as an optical disk or card. Two or more light beams reflected from the optical memory are detected by a photodetector. A correction circuit processes the photoelectric signals received from the photodetector to correct for the effect of other than one light beam on the focusing of the system on the optical recording medium.

14 Claims, 10 Drawing Sheets

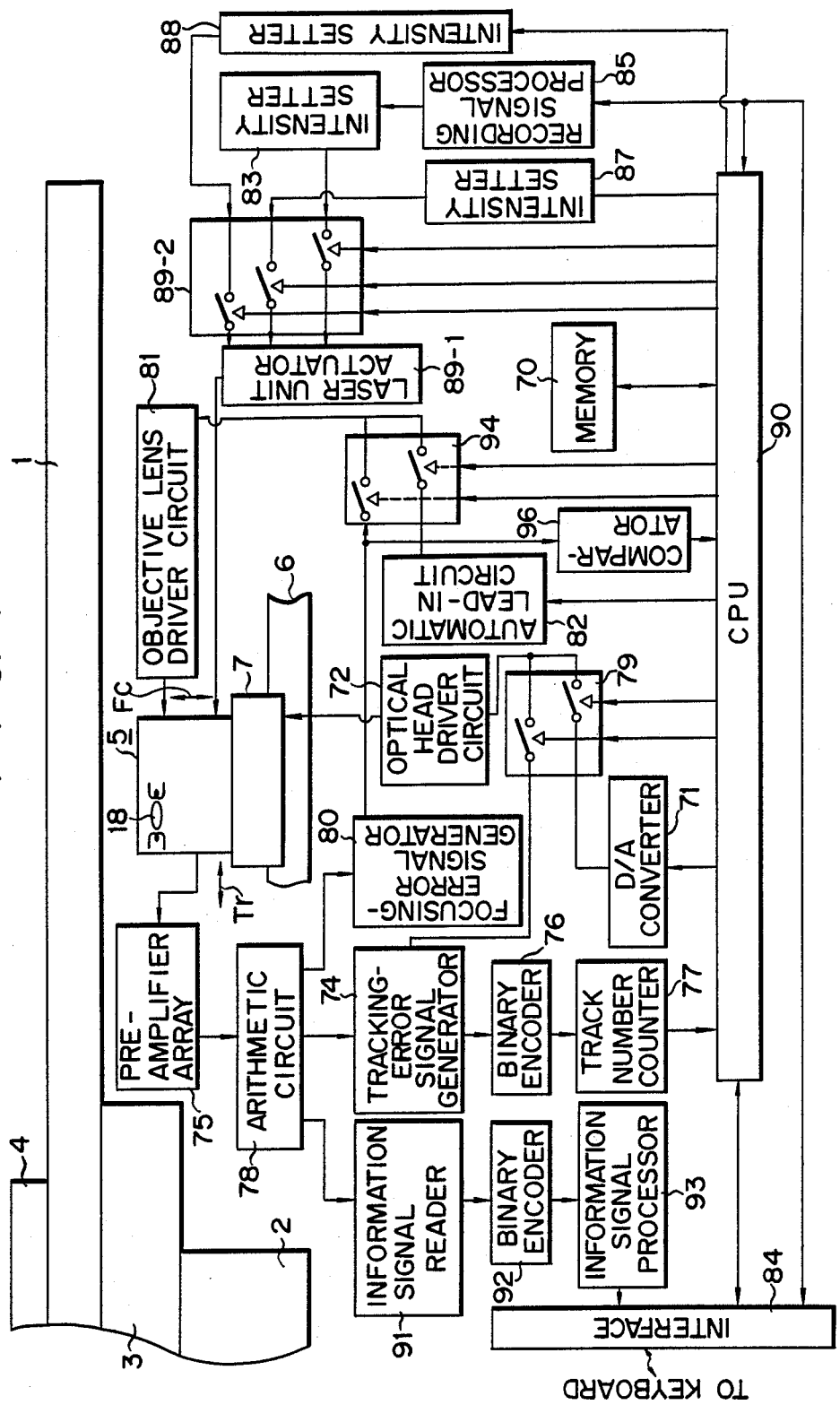
F I G. 1

APPARATUS FOR CORRECTING PHOTODETECTOR SIGNALS IN A SYSTEM FOR RETRIEVING INFORMATION FROM AN OPTICAL RECORDING MEDIUM

This application is a continuation, of application Ser. No. 018,489, filed Feb. 25, 1987 now abandoned.

BACKGROUND OF THE INVENTION

The present invention relates to a system capable of retrieving information from an optical recording medium memory, and more specifically, to an information retrieving system in which light beams from two or more light sources are converged on an optical memory.

Conventionally, there are various types of information retrieving systems in which light beams from two or more light using sources are converged on an optical memory. The optical memory used in such systems can be a memory used exclusively for retrieving data, a memory for recording and retrieving data or a memory capable of recording, retrieving and erasing data. They can be in the form of a disk, card or other appropriate medium. Designed using the appropriate memory, the information retrieving system can be a read-after-write type in which information is retrieved immediately after it is recorded on the optical memory by means of a recording laser beam. Another example is a write- or read-after-erase type in which new information is recorded on the optical memory immediately after previously recorded information is erased by means of an erasing laser beam, or in which unerasable pre-information pits are retrieved while information recorded on the optical memory is being erased. The information retrieving systems of these types include a focusing servo system for accurately controlling the focus of the recording or retrieving laser beam on the optical memory, and a tracking servo system for tracking accurately with the recording or retrieving laser beam. In an optical system using the conventional focusing servo system, if two laser beams impinge on one photodetector for focus detection, the focusing state of an objective lens cannot be detected accurately. Therefore, different wavelengths are used for the two laser beams. Also, an optical separator, such as a dichroic mirror, is disposed in the optical path of the laser beams returned from the optical memory. Thus, each laser beam is divided into two beams, only one of which is introduced into the photodetector for focus detection. In the optical system of this type, the optical separator must be located in the optical path, so that the optical path must be relatively long. Accordingly, the optical system tends to be large and heavy in weight. Usually, moreover, the optical system is incorporated in an optical head which is moved by a linear actuator. If the optical head is heavy in weight, it takes an excessive amount of time to move the head. Thus, it requires much time to access recorded information.

These problems can be settled by optical systems which are disclosed in U.S. patent application Ser. Nos. 673,764; 705,305; and 713,598, filed on Nov. 21, 1984; Feb. 25, 1984; and Mar. 19, 1985, respectively, by the present applicant Ando. In these optical systems, however, a light shielding plate must be located accurately in the optical path, so that the adjustment and assembly of the system are difficult.

SUMMARY OF THE INVENTION

The object of the present invention is to provide a system capable of retrieving information from an optical memory including an optical system which is simple in construction and in which the focusing state of an objective lens can be accurately detected.

A further object of the invention is to process the photoelectric signals to generate a control signal free of noise to control focusing of the system.

According to the present invention, there is provided a system capable of retrieving information from an optical memory, comprising: means for emitting a first and a second light beam; lens means for converging first and second light beams onto the optical memory and transferring the first and second light beams from the optical memory; photodetector means responsive to the transferred first and second light beams for converting the first light beam and the second light beam into respective first and second photoelectrical signals; and means for processing the photoelectric signals received from the photodetector means to generate a control signal responsive only to the first photoelectric signal. The control signal can be used to control the movement of the lens means along its optical axis to focus it on the optical memory.

BRIEF DESCRIPTION OF THE DRAWINGS

FIG. 1 is a block diagram of a circuit for driving an optical head according to the present invention;

DETAILED DESCRIPTION OF THE PREFERRED EMBODIMENTS

Figure 2:
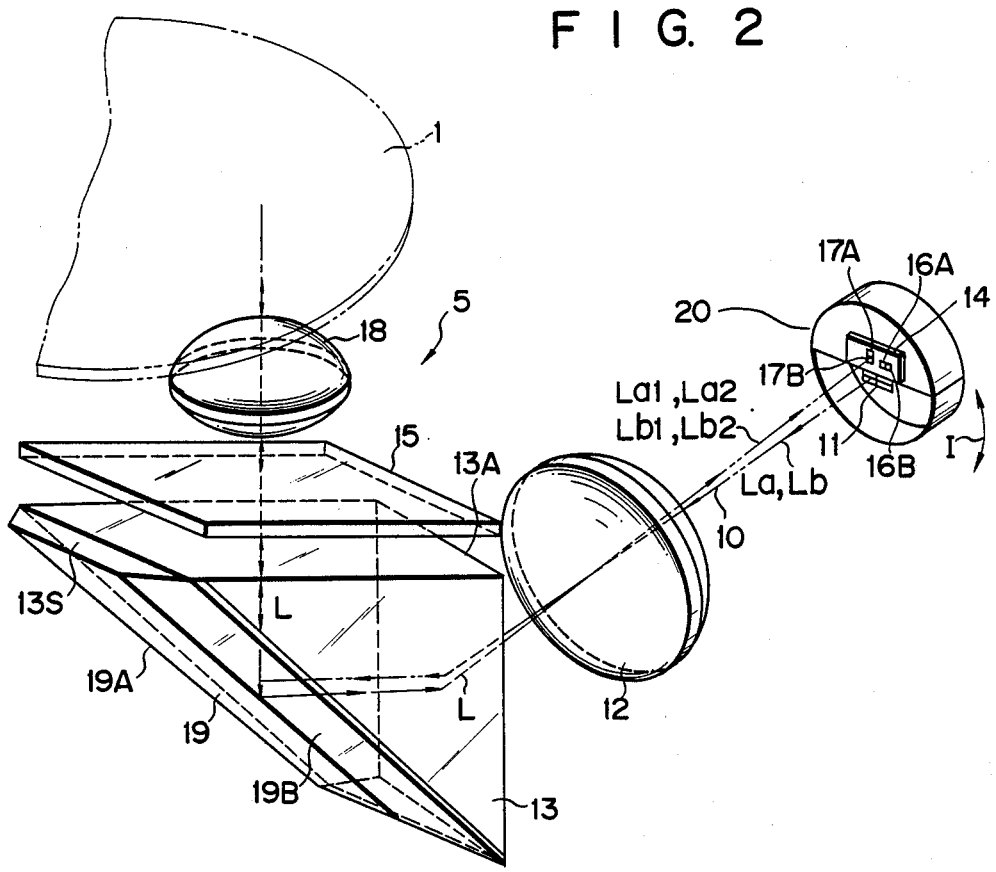
FIG. 2 is a perspective view of an optical head according to an embodiment of the invention.

As shown in FIG. 1, an optical memory, here shown as optical disk 1, is mounted on turntable 3, which is rotated by driving shaft 2. Clamper 4 is disposed on disk 1 to hold the disk against turntable 3. Disk 1 has a light reflective record layer on at least one side. Information can be recorded on or retrieved from the record layer such as by forming or removing pits or recesses in the layer. The layer is formed with a spiral or concentric tracking guide normally formed by a groove. Provided adjacent to disk 1 is optical head 5, which includes an optical system as shown in FIG. 2. Head 5 is mounted on carrier block 7, which is disposed within guide frame 6 which allows for slidable movement in the radial direction of disk 1.

Referring to FIG. 1, the operation of the information recording/retrieving apparatus will be described. In the access mode, CPU 90 receives an access program, from memory 70 for moving optical head 5 to access the tracking guide. Then, CPU 90 delivers an access mode signal to analog switch unit 79, to connect optical-head driver circuit 72 to D/A converter 71, and CPU 90 also supplies an access signal to optical head driver circuit 72 through D/A converter 71 so that circuit 72 is actuated. Circuit 72 delivers a drive signal to a head driving coil (not shown). As a result, head 5 is transported in the direction of arrow Tr along guide frame 6. In the access mode, the tracks are counted, starting from a predetermined position or a previously accessed and known tracking guide location. Thus, the tracking guides, to which head 5 is directed, are recognized one after another. In other words, output signals from tracking-error signal generator 74 are binary-coded by binary encoder 76, which generates one pulse each time head 5 crosses one tracking guide. The pulses, and hence the tracking guides, are counted by track number counter 77. CPU 90 delivers the tracking mode signal to analog switch unit 79 to change the operation mode from the access mode to the tracking mode, whereupon counter 77 generates a stop signal to stop the access movement of optical head 5 after the end of access. Switch unit 79 connects tracking-error signal generator 74 to optical head driver circuit 72, in response to the tracking mode signal. Thus, the correction of tracking error is started. Photoelectric signals delivered from photodetector 14, which is included in head 5 and shown in FIG. 2, are amplified by preamplifier array 75, and processed by arithmetic circuit 78, including adders and other elements, as described below. The processed signals are supplied to signal generator 74, whereupon generator 74 delivers a tracking-error signal. The tracking-error signal is supplied through analog switch unit 79 to optical head driver circuit 72 for moving optical head 5. As a result, head 5 is moved, thus correcting the tracking error. If objective lens 18 is in a defocused state, head 5 is moved in the direction of arrow Fc by objective-lens driver circuit 81, in response to a focusing-error signal from focusing-error signal generator 80. Lens 18 is thereby kept in the focusing state. Immediately before the focusing servo loop is closed, switch unit 94 is shifted so that objective lens driver circuit 81 is connected to automatic lead-in circuit 82. As result, circuit 82 is actuated, so that objective lens 18 is returned to its initial position.

Recording beam intensity setter 83 is supplied with a recording signal from an external device, e.g., a keyboard (not shown), via interface 84 and recording signal processor 85 for generating a recording signal. The recording signal is responsive to information to be stored in the optical memory, and an actuating signal, corresponding to the recording signal, is supplied to laser array 11 (a part of head assembly 5) from laser unit actuator 89-1 so that a recording laser beam is emitted from laser array 11. In response to a command supplied externally through interface 84, a retrieving-mode signal is delivered from retrieving beam intensity setter 87 so that an actuating signal is supplied to laser array 11 from actuator 89-1. Also, an erasing mode signal is delivered from erasing beam intensity setter 88, in response to a command through interface 84 so that an actuating signal is supplied to laser array 11 from actuator 89-1. Analog switch unit 89-2 is shifted in response to commands for individual modes from CPU 90, so that the corresponding signals are supplied to laser unit actuator 89-1.

When the beam is out of focus above a predetermined level in the erasing mode, the erasing laser beam disappears. That is, when the level of the focusing-error signal generated by focusing-error signal generator 80 reaches a predetermined level, comparator 96 connected to focusing-error signal generator 80 produces a high-level signal. Responsive to this signal, CPU 90 supplies a command for interrupting erasing mode to analog switch 89-2, in order to deenergize erasing laser 11-2. When the level of the focusing-error signal generated by focusing-error signal generator 80 returns to a level lower than the predetermined level, comparator 94 connected to focusing-error signal generator 80 produces a low-level signal. In this case, CPU 90 supplies a command for initiating the erasing mode to analog switch 89-2, whereby erasing laser 11-2 is again energized. It is therefore possible to prevent information from being erroneously erased when the beam goes too far out of focus.

The signals processed by arithmetic circuit 78 are read by information signal reader 91, and binary-coded by binary encoder 92. Then, the signals are supplied to information signal processor 93 for modulation and demodulation of information signals and for error correction. Thereupon, the signals are converted into a regenerative signal, which is delivered to the external device through interface 84.

Reference will now be made to the remaining Figures to describe in more detail the construction and operation of the optical head 5 and the associated circuitry which embody the present invention. Optical head 5 has means for emitting a first and a second light beam. As shown in FIG. 2, the emitting means is a semiconductor laser array 11, having first and second lasers 11-1 and 11-2 for emitting the recording or retrieving laser beam La and the erasing laser beam Lb, respectively, which are disposed on optical axis 10 of convex lens 12. Convex lens 12 serves both as a collimator lens and a projection lens. Divergent first and second laser beams La and Lb are emitted from light emitting points of laser array 11 and are located in the focal plane of lens 12.

Means for converging the laser beams La and Lb onto the optical memory 1, as here embodied, includes lens 12, prism 13, quarter-wave plate 15 and objective lens 18. As they pass through lens 12, the beams are converted into collimated laser beams and are projected on prism 13. Since prism 13 has its incidence surface 13A inclined relative to optical axis 10 of lens 12, the cross section of each collimated laser beam is changed from an elliptic shape to a circular one, as the beam, incident on surface 13A, is refracted. As they advance in prism 13, the laser beams are reflected by polarizing surface 13S of the prism. Then, after passing through quarter-wave plate 15, the first and second laser beams La and Lb are converged on optical memory 1 by objective lens 18.

If the erasing and recording laser beams are applied to the record layer of optical memory 1, in a recording mode, information is erased successively from the record layer by the erasing laser beam, and new information is recorded on the erased region of the record layer by the recording laser beam. Typically the information is recorded as a change of state of a domain, on the record layer. In a retrieving mode, the retrieving laser beam is emitted only from first semiconductor laser 11-1 the erasing laser beam is not emitted from the second semiconductor laser 11-2. In an erasing mode, the erasing and retrieving laser beams are applied to the record layer, so that the information is erased, and unerasable permanent recorded data, e.g., a sector address or track address recorded as prepits, is retrieved by the retrieving laser beam.

As shown in FIG. 2 the beams are then transferred through the optics from the optical memory 1 to a photodetector means which in this embodiment is photodetector 14. The laser beams reflected by optical memory 1 are introduced into prism 13 through objective lens 18 and quarter-wave plate 15, and then returned to polarizing surface 13S. As the laser beams pass through plate 15, their vibrating direction is rotated 90°. Thus, the beams are converted into linearly polarized laser beams by plate 15. Returned to surface 13S, the laser beams are transmitted through it to be introduced into prism member 19, which is coupled to surface 13S and serves to separate the beams.

Figure 3:
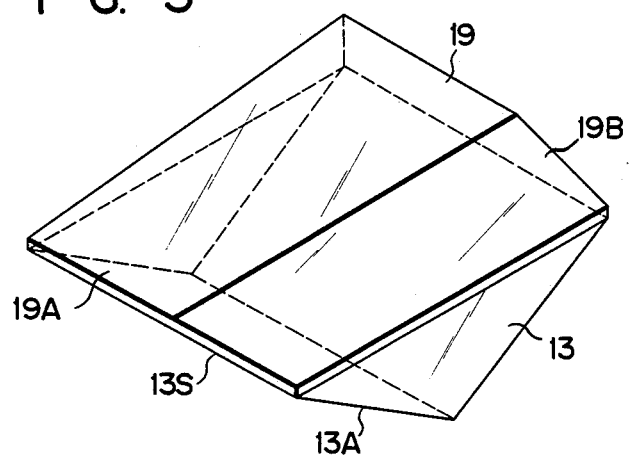
FIG. 3 is a perspective view of a beam splitter shown in FIG. 2.

As shown in FIG. 3, prism member 19 has first and second total-reflection surfaces 19A and 19B, which adjoin at a certain angle to each other and are not parallel to polarizing surface 13S. The boundary line between surfaces 19A and 19B extends substantially at right angles to the direction of the tracking guide defined by the groove on the optical memory 1. Preferably, first surface 19A is flat, and second surface 19B is a cylindrical convex-lens surface which functions as an astigmatic surface. Surfaces 19A and 19B are not limited to these configurations, and may be formed individually of many nonspherical surfaces with different single or complex radii of curvature.

In the embodiment described, prism member 19 is coupled directly to prism 13. Alternatively, however, the prism may be arranged separately.

Figure 4:
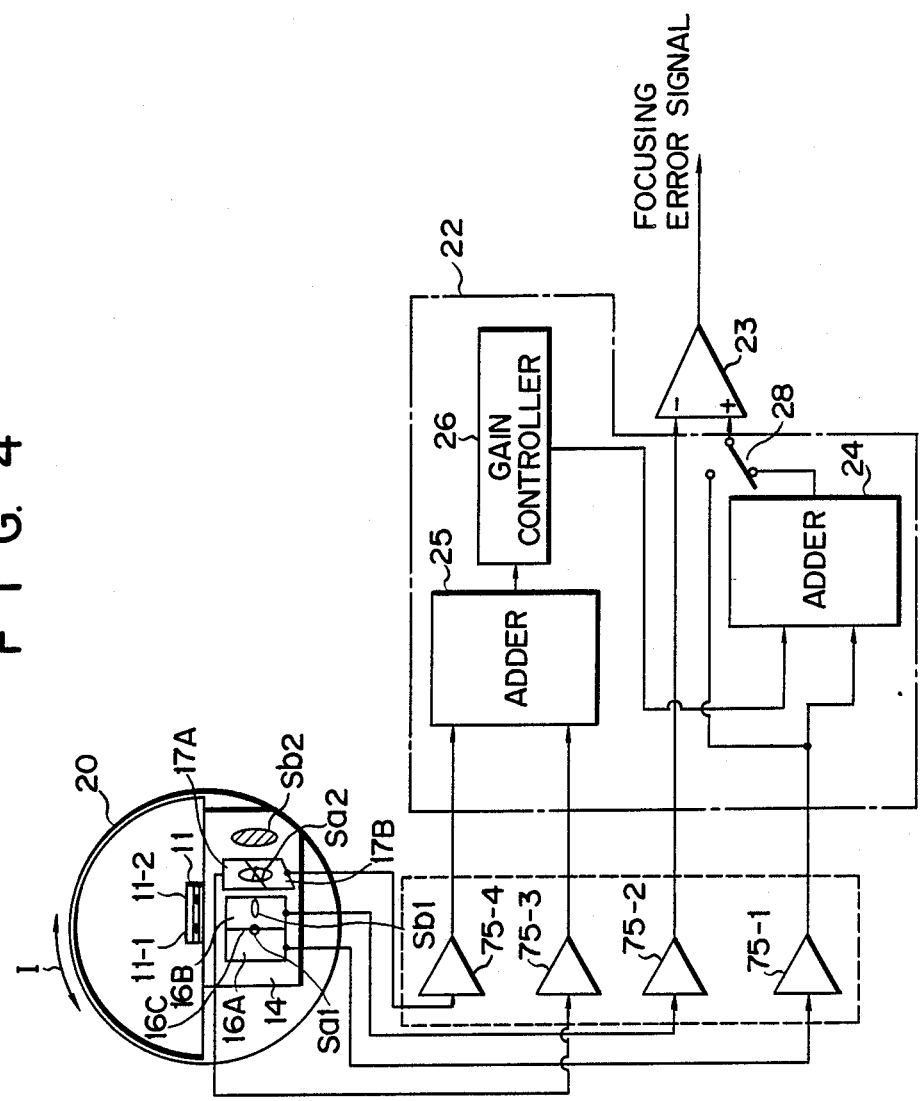
FIG. 4 shows a circuit arrangement including a correction circuit of the optical head shown in FIG. 2, which generates a focusing-error signal, according to the first embodiment of the invention.

Each of laser beams La and Lb, incident on total-reflection surfaces 19A and 19B, is separated into first and second laser beams La1 and La2, and Lb1 and Lb2. Each of these beams is directed along a different optical axis. The beams then pass through polarizing surface 13S to be incident on convex lens 12. Lens 12 directs first and second laser beams La1, La2, Lb1 and Lb2 to photodetector 14, which is located adjacent to semiconductor laser array 11, on single mount 20 as shown in FIG. 4. Photosensitive regions 16A, 16B, 17A and 17B of photodetector 14, like the light emitting points of laser array 11, are located substantially in the focal plane of lens 12. First laser beams La1 and Lb1, reflected by reflecting surface 19A, are converged on a pair of photosensitive regions 16A and 16B for focusing-error detection. One of second laser beams La2 and Lb2, reflected by reflecting surface 19B, is projected on a pair of photosensitive regions 17A and 17B for detecting tracking error from a diffraction pattern which is produced when the laser beam impinges on the optical memory and is diffracted by the tracking guide, for example by pits formed in the groove of the tracking guide. The other of second laser beams La2 and Lb2 is projected on a photo-insensitive region outside photosensitive regions 16A, 16B, 17A and 17B. Reflected by surface 19B, the second laser beam is astigmatized by surface 19B which functions as an astigmatic surface. Accordingly, beam spot Sa2 formed on regions 17A and 17B is elongated at right angles to the direction of the tracking guide on optical memory 1, or that of the image of the guide projected on photodetector 14.

In the optical system described above, the focusing error and tracking error are detected by the knife-edge method and push-pull method, respectively. The detailed descriptions in U.S. Pat. Nos. 4,585,933 and 4,546,460 and U.S. patent application Ser. No. 817,259 by the present inventor which describe the respective principles of these two methods are incorporated by reference.

First recording or retrieving laser beam La1, reflected by reflecting surface 19B, is deflected or moved as objective lens 18 is moved along its optical axis. That is if lens 18 is in a focused state, first laser beam La1 is directed to a photo-insensitive region 16C between photosensitive regions 16A and 16B. However, if lens 18 is in a defocused state, beam La1 will be directed to either region 16A or 16B.

In the retrieving mode, retrieving laser beam La is emitted only from first laser beam emitting point 11-1, so that only first retrieving laser beam La1 is reflected by reflecting surface 19B. Therefore there is no interference problem. In the erasing or recording mode, however, recording or retrieving laser beam La and erasing laser beam Lb are emitted from first and second semiconductor lasers 11-1 and 11-2, so that first recording or retrieving laser beam La1 and first erasing laser beam Lb1 are reflected by reflecting surface 19A. Laser beam Lb1, like laser beam La1, is directed to one of photosensitive regions 16A and 16B. Thus, even though objective lens 18 is in the focused state (beam spot Sa1 lying on the photo-insensitive region 16C between photosensitive regions 16A and 16B), beam spot Sb1 is formed by laser beam Lb1 on one of regions 16A and 16B (See FIG. 4). A signal responsive to the beam spot Sb1 on one of regions 16A or 16B is compensated for by correction circuit 22 (FIG. 4) to eliminate its effect on movement of lens 18 for focusing. Thus, objective lens 18 is always kept in the focused state by a focusing-error signal delivered by the error correction circuit 22.

The tracking guide on the optical memory is detected from the location of diffraction patterns which are produced as beam spot Sa2 formed on photosensitive regions 17A and 17B by second recording or retrieving laser beam La2, which is reflected by reflecting surface 19A. If lens 18 is directed toward a desired track so that the track is traced correctly with laser beams La and Lb, diffraction patterns of equal areas are produced by laser beam spot Sa2 on photosensitive regions 17A and 17B. As a result, photoelectric signals of equal levels are delivered from regions 17A and 17B. Accordingly, a differential amplifier (not shown) produces a tracking-error signal of a zero level, which indicates that the desired track is traced correctly with the laser beam. If the desired track is not traced correctly, diffraction patterns of different areas are produced in laser beam spot Sa1 on regions 17A and 17B. As a result, photoelectric signals of different levels are delivered from regions 17A and 17B. Accordingly, the amplifier produces a tracking-error signal of a plus or minus level, which indicates that the desired track is not traced correctly. This signal is used as a feedback control to keep the laser beam on track.

The system of this invention includes means for processing the photoelectric signals received from photodetector 14. As here embodied the processing means includes correction circuit 22 which will now be described in detail in connection with FIG. 4. The correcting circuit 22 generates a correction signal or a compensation signal corresponding to beam split Sb1 to compensate the signal produced from one of the photosensitive regions 16A and 16B on which the beam spot Sb1 is formed.

The input side of correction circuit 22 is connected to photodetector 14 through preamplifier array 75, and its output side is connected to differential amplifier 23. Photosensitive regions 16A and 16B are connected to preamplifiers 75-1 and 75-2, respectively. Preamplifier 75-2, which is connected to region 16B on which beam spot Sb1 is formed, is directly coupled to amplifier 23. Preamplifier 75-1 is connected to amplifier 23 through adder 24 and analog switch 28 or just through switch 28 depending on the switch position. Photosensitive regions 17A and 17B are connected to adder 25 through preamplifiers 75-3 and 75-4 respectively. Adder 25 is connected to gain controller 26, which is coupled to adder 24.

The operation of correction circuit 22 will now be discussed. In the retrieving mode, analog switch 28 is connected to a contact which is coupled directly to preamplifier 75-1. In this mode, moreover, beam spot Sb1 is absent, and only beam spot Sa1 is formed on one or both of photosensitive regions 16A and 16B. Thus, if objective lens 18 is in the focused state, photoelectric signals of equal levels are generated from regions 16A and 16B, and a zero-level focusing signal is delivered from differential amplifier 23. If lens 18 is in the defocused state, on the other hand, photoelectric signals of different levels are generated from regions 16A and 16B, and a plus or minus focusing-error signal is delivered from amplifier 23.

In the recording or erasing mode, the photoelectric signal from photosensitive region 16B includes noise produced by beam spot Sb1. Accordingly, if a correction or compensating signal of a level equal to that of the photoelectric signal produced by beam spot Sb1 on region 16B is added to the photoelectric signal from photosensitive region 16A, the output signal of differential amplifier 23 will not include the photoelectric signal produced by beam spot Sb1, that is, the noise is cancelled.

The correction circuit 22 operates to eliminate the photoelectric noise signal based on the following factors. In general, the intensity ratio between erasing laser beam Lb and retrieving or recording laser beam La is fixed. Therefore, the ratio between the intensity of laser beam Lb and the sum of those of laser beams Lb and La is also fixed. Formed on photosensitive regions 16A and 16B are beam spot Sb1, corresponding to erasing laser beam Lb, and beam spot Sa1 corresponding to retrieving or recording laser beam La. The reflection factor of the optical disk is not wholly uniform and is subject to some variation. However, the intensity of beam spot Sb1, which corresponds to the level of the correction signal, can be determined from the reflection factor, based on the aforesaid intensity ratio.

In the erasing or recording mode, analog switch 28 is connected to adder 24. A summation signal having a level equivalent to the sum of the intensities of beam spots Sa1 and Sb1 is delivered to adder 24, and a summation signal corresponding to the beam spot Sa2 is delivered from adder 25 to gain controller 26. In controller 26, the summation signal is converted into a correction signal of a level equivalent to the intensity of beam spot Sb1. In adder 24, the correction signal is added to the photoelectric signal from photosensitive region 16A. As in the case of the retrieving mode, therefore, differential amplifier 23 delivers a correct focusing or focusing-error signal.

The operation of gain controller 26 will now be explained. The ratio (I1/I2) of intensity I1 of retrieving laser beam La to intensity I2 of erasing laser beam Lb is constant, and is defined by the following relationship:

$$K_o = I1/I2 \tag{1}$$

where Ko represents a constant. Beam spots Sa1, Sa2, Sb1 and Sb2 are formed by separating laser beams La and Lb. Therefore, intensities I1 and I2 can be expressed as follows:

$$I1 = (Sa1 + Sa2)\eta 1 \tag{2}$$

$$I2 = (Sb1 + Sb2)\eta 2 \tag{3}$$

where Sa1, Sa2, Sb1 and Sb2 represent the beam intensities at the above respective beam spots, and $\eta 1$ and $\eta 2$ represent the attenuation constants. These constants represent the amount the laser beams attenuate while passing the optical path from semiconductor laser 11 to photodetector 14 and are determined by the reflectivity of the optical disk and the transmittances of the optical parts of the system. Since laser beams La and Lb are split at a constant ratio, equations (4) and (5) follow:

$$K1 = Sa1/Sa2 \tag{4}$$

$$K2 = Sb1/Sb2 \tag{5}$$

where K1 and K2 are constants. Taking into account equations (2) and (3), equation (1) can be expressed as follows:

$$K = \frac{I1}{I2} = \frac{(Sa1 + Sa2)}{(Sb1 + Sb2)} \cdot \frac{\eta 1}{\eta 2} \tag{6}$$

From equation (6), the following equations are obtained:

$$K \cdot \eta 2 (Sb1 + Sb2) = (Sa1 + Sa2)\eta 1$$

$$K \cdot \eta 2 \cdot Sb1 \cdot \left(1 + \frac{Sb2}{Sb1}\right) = Sa2 \left(\frac{Sa1}{Sa1} + 1\right)\eta 1$$

Further, the following equations are obtained from equations (4) and (5).

$$Sb1 \cdot K \cdot \eta 2 \cdot \left(1 + \frac{1}{K2}\right) = Sa2(K1 + 1)\eta 1$$

$$Sb1 = Sa2 \cdot \frac{\eta 1(K1 + 1)}{Ko \cdot \eta 2 \cdot (1 + 1/K2)} \tag{7}$$

As set forth above, adder 25 generates an addition signal having a level corresponding to beam spot Sa2. Gain G of gain controller 26 can therefore be determined as follows, using equation (7).

$$G = \frac{\eta 1(K1 + 1)}{K \cdot \eta 2 \cdot (1 + 1/K2)} \tag{8}$$

That is, equation (7) can be expressed as follows:

$$Sb1 = Sa2 \cdot G \tag{9}$$

Thus, gain controller 26 outputs a signal having a level corresponding to Sb1 in equation (9). This output signal is added, by adder 24, to the signal produced by preamplifier 75-1. As a result, noise Sb1 is canceled in differential amplifier 23 to which are supplied the signal from adder 24, and the signal produced by preamplifier 75-2.

Figure 6:
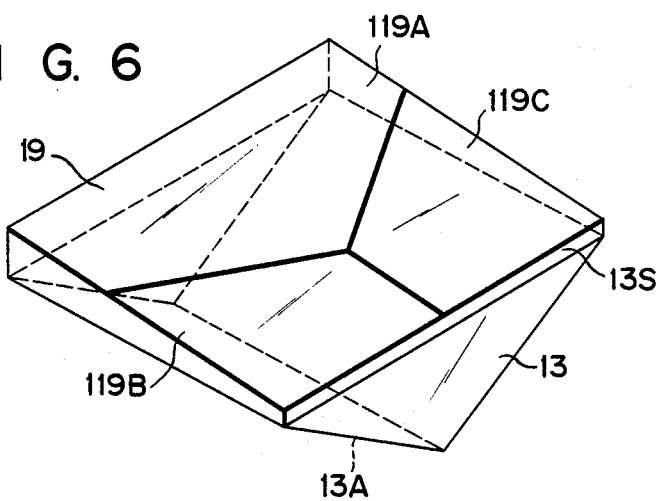
FIG. 6 is a perspective view of a beam splitter shown in FIG. 5.

In the above embodiment, prism 13 has incidence surface 13A, which is inclined relative to optical axis 10 of convex lens 12. Therefore, the cross section of the collimated laser beam is changed from an elliptic shape to a circular one, as the beam, incident on surface 13A, is refracted. Also, the laser beam, reflected by the reflecting surface of prism 13 and directed to convex lens 12, is refracted by surface 13A. Thus, the cross-sectional shape of the beam is changed, and the beam diameter is increased substantially. As the beam diameter is increased in this manner, the image magnification of the optical system is enlarged, so that the focusing-error sensing capability of the system can be improved, as disclosed in U.S. patent application Ser. No. 742,396, filed on June 7, 1985, by Ando. Especially in the optical system using the knife-edge method, as shown in FIGS. 2 and 6, the laser beam is elongated in the direction of deflection, in accordance with the size of tracking error. Accordingly, the sensitivity of the laser beam to deflection is increased, so that the focusing-error sensing capability of the system is particularly improved.

As shown in FIGS. 2 and 4, mount 20 is in the form of a cylindrical part rotatable in the direction of arrow I. The center of rotation of mount 20 is in alignment with the optical axis of convex lens 12, so that the light emitting point of semiconductor laser array 11 is located on the center of mount 20. Thus, even though mount 20 is rotated, the laser beam can travel in an optical path along a fixed optical axis. If mount 20 is rotated in direction I, photosensitive regions 16A and 16B for focusing-error detection are rotated in the same direction. Namely, first recording and retrieving laser beam La is focused on a predetermined point when objective lens 18 is in the focusing state, and photosensitive regions 16A and 16B are moved to the predetermined point when mount 20 is rotated in direction I. In other words, the beam spot is moved substantially in the circumferential direction of mount 20, on regions 16A and 16B. In assembling or adjusting optical head 5, therefore, the optical system for focus detection can be adjusted easily by rotating mount 20 so that the beam spot is formed on the photosensitive region between regions 16A and 16B, while keeping objective lens 18 in the focused state.

When adjusting the optical system for tracking guide detection, polarizing prism 13 is shifted along a ridge line between first and second surfaces 19A and 19B, to form the beam spot equally distributed on photosensitive regions 17A and 17B for tracking-guide detection, while keeping lens 18 in the focused state. First laser beam spots Sa1 and Sb1 are not shifted on photodetector 14, and only second laser beam spots Sa2 and Sb2 are shifted in a direction along which regions 17A and 17B are arranged. Objective lens 18 is maintained in the focused state, and polarizing prism 13 is shifted along the ridge line between first and second reflecting surfaces 19A and 19B. To facilitate the adjustment of the optical system, mount 20 and convex lens 12 are supported by a lens barrel (not shown).

Figure 5:
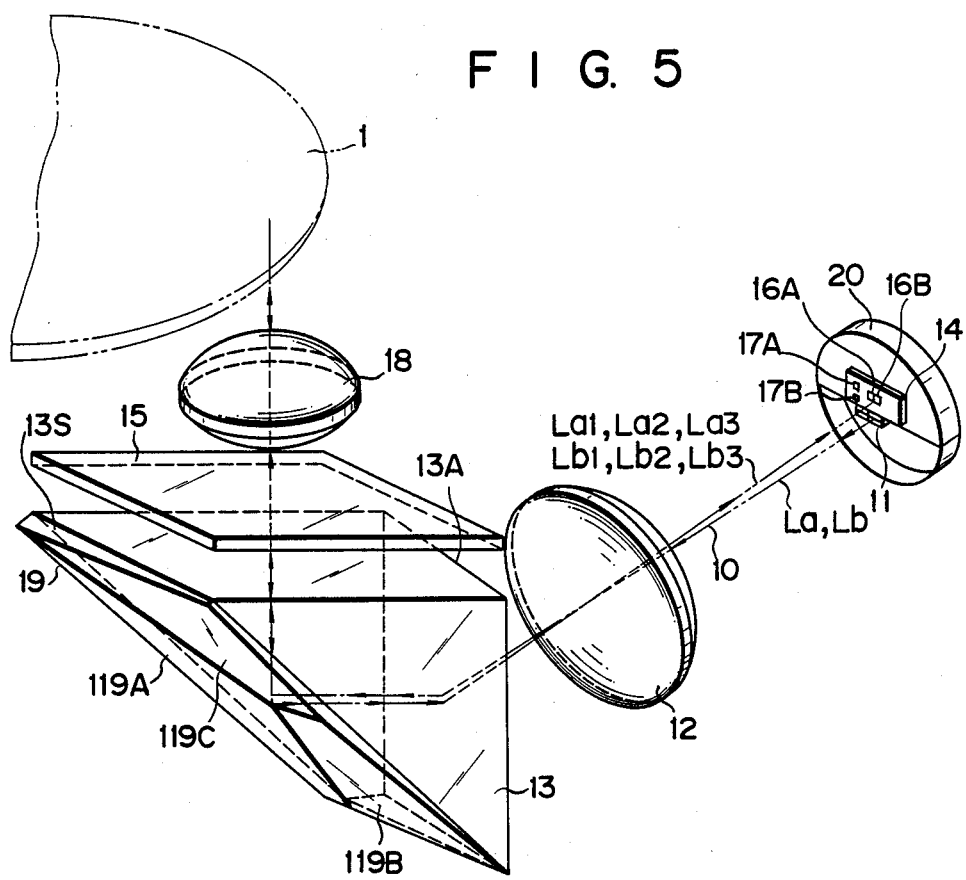
FIG. 5 is a perspective view of an optical head according to another embodiment of the invention.

Referring now to FIG. 5, an optical system of an optical head according to another embodiment of the present invention will be described. In the optical system shown in FIG. 5, prism member 19, which is disclosed in U.S. patent application Ser. No. 862,829, filed on May 13, 1986, by Ando, has three total-reflection surfaces 119A, 119B and 119C which adjoin at a certain angle to one another, extending nonparallel to polarizing surface 13S, as shown in FIG. 6. The boundary line between surfaces 119B and 119C extends substantially in the extended direction of the groove of the tracking guide on optical memory 1 or that of an image of the tracking guide projected on photodetector 14 which is in the image plane of lens 12. Each of laser beams La and Lb, reflected by total-reflection surfaces 119A, 119B and 119C, are respectively separated into first, second and third laser beams La1, La2 and La3, and Lb1, Lb2 and Lb3, each directed along different optical axes. The beams then pass again through polarizing surface 13S to be incident on convex lens 12. Laser beams La1, La2, La3, Lb1, Lb2 and Lb3 are directed to photodetector 14. First laser beams La1 and Lb1, reflected by reflecting surface 119A, are converged on a pair of photosensitive regions 16A and 16B for detection of focusing-error. Second and third laser beams La2 and Lb3, and La3 and Lb2, reflected by reflecting surfaces 119B and 119C, respectively, are converged on a pair of photosensitive regions 17A and 17B which are slightly separated from one another.

Figure 7:
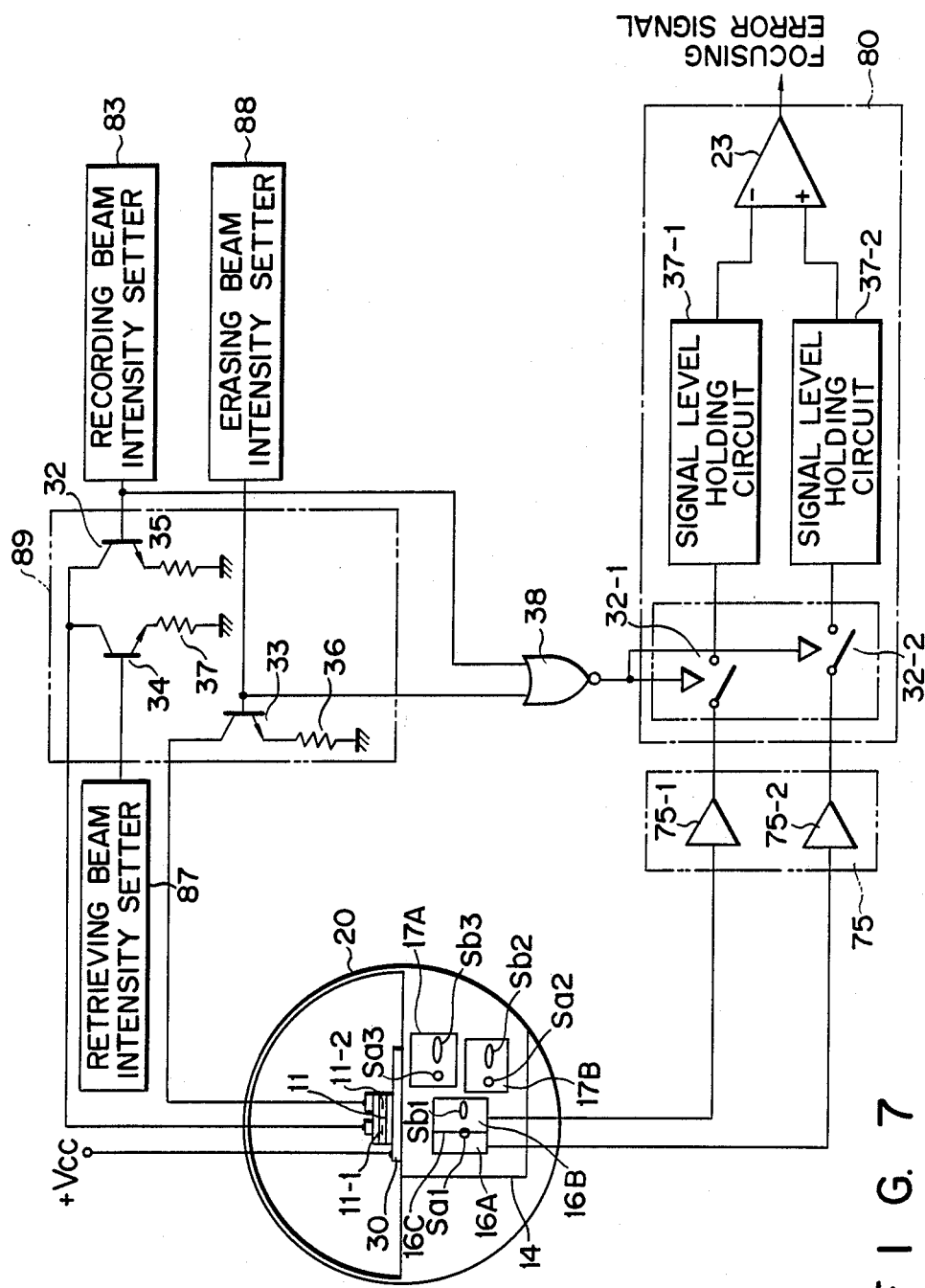
FIG. 7 shows a circuit arrangement of the optical head shown in FIG. 5, according to a second embodiment of the invention.

A circuit arrangement of the optical head shown in FIG. 5 is depicted in FIG. 7. As shown in FIG. 7, first and second lasers 11-1 and 11-2 of semiconductor laser array 11, for emitting retrieving or recording laser beam La and erasing laser beam Lb, are arranged on mount electrode 30, to which supply voltage $V_{CC}$ is applied. Transistor 34, which is grounded through resistor 37, is connected to first laser 11-1. In the retrieving mode, transistor 34 is turned on by retrieving beam intensity setter 87 for setting the intensity of the retrieving laser beam. Also, a retrieving voltage is applied to first laser 11-1, so that laser 11-1 is energized to emit retrieving laser beam La. In the recording mode, transistor 35 is turned on by recording beam intensity setter 83 for setting the intensity of the recording laser beam. At the same time, transistor 33 is turned on by erasing beam intensity setter 88 for setting the intensity of the erasing laser beam. Transistor 33 is grounded through resistor 36 and connected to second laser 11-2. Thus, first and second lasers 11-1 and 11-2 are energized to emit recording and erasing laser beams La and Lb, respectively. In the erasing mode, transistors 34 and 33 are turned on by first and third intensity setters 87 and 88, respectively. As a result, first and second lasers 11-1 and 11-2 are energized to emit retrieving and erasing laser beams La and Lb, respectively.

In the retrieving mode, prior to the recording or erasing in the circuit arrangement shown in FIG. 7, objective lens 18 is kept in the focused state by closing analog switches 32-1 and 32-2. The photoelectric signals from photosensitive regions 16B and 16A are amplified by amplifiers 75-1 and 75-2. The amplified signals are supplied to differential amplifier 23 via signal-level holding circuits 37-1 and 37-2. Accordingly, the focused-error signal is delivered from amplifier 23, and objective lens 18 is kept in the focused state by using the focusing-error signal as a feedback control.

If the operation mode is switched from the retrieving mode to the erasing or recording mode, an erasing- or recording-mode signal is supplied to analog switches 32-1 and 32-2 through OR circuit 38, so that the switches are opened. Thereupon, signal-level holding circuits 37-1 and 37-2 continue to hold the signal level as it was before switches 32-1 and 32-2 were opened, that is, at the level in the focused state detected in the retrieving mode. In this way objective lens 18 is kept in the focusing state in the erasing or recording mode. Using the circuit arrangement shown in FIG. 7, lens 18 (FIG. 5) can be kept in the focused state, without being influenced by beam spot Sb1 in photosensitive region 16B.

Figure 8:
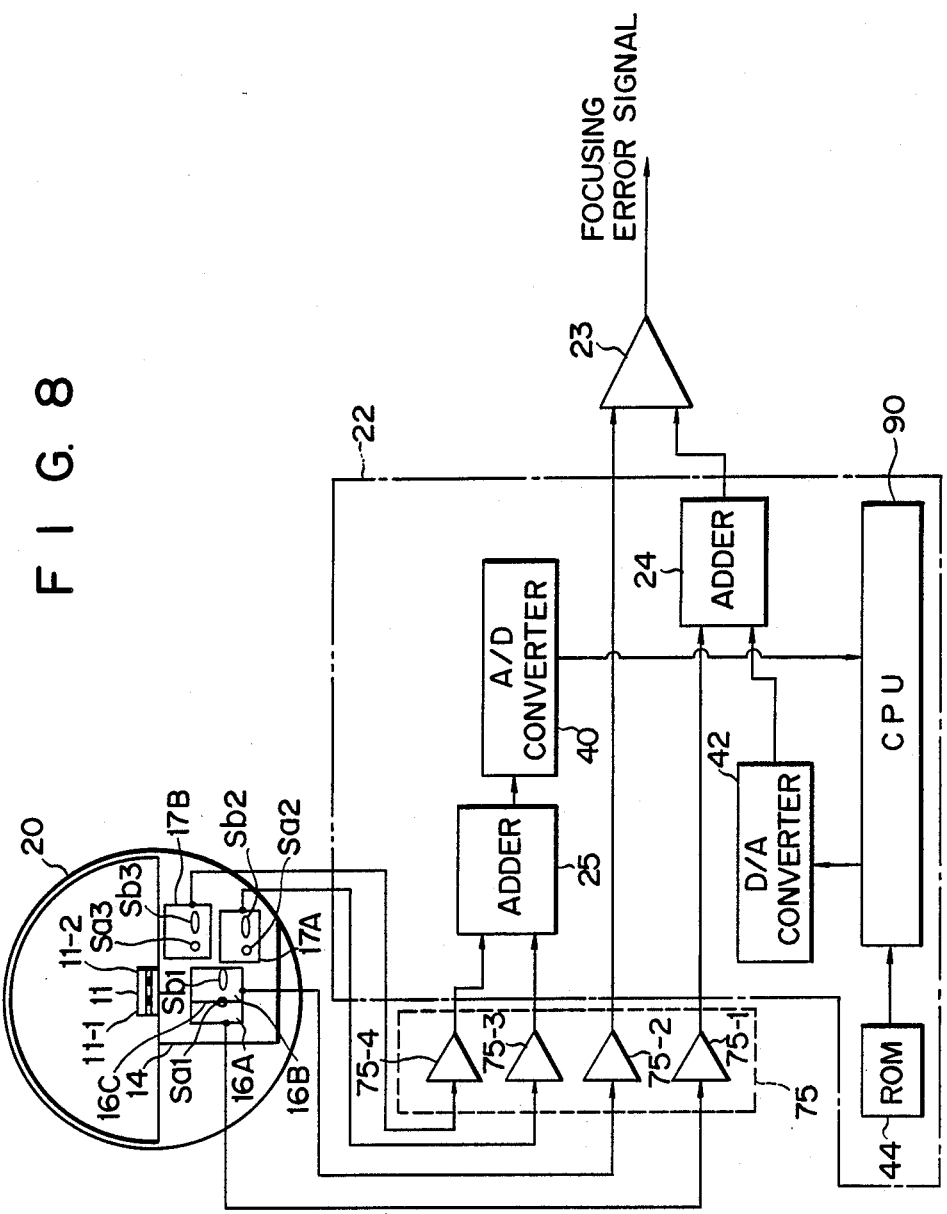
FIG. 8 shows another circuit arrangement of the optical head shown in FIG. 5.

Referring now to FIG. 8, another embodiment of the circuit arrangement which can be used in the optical head shown in FIG. 5 will be described. In the description to follow, like reference numerals are used to designate like portions or members as in the foregoing embodiments. In the circuit arrangement shown in FIG. 8, in contrast with the one shown in FIG. 4, A/D converter 40, D/A converter 42, ROM 44, and CPU 90 are used in place of the gain controller. Stored in ROM 44 is the ratio of the intensity of retrieving or recording laser beam La to the intensity of erasing laser beam Lb.

In the retrieving mode, only the retrieving laser beam La is emitted, so that only beam spots Sa1, Sa2 and Sa3 are formed on photodetector 14, while beam spots Sb1, Sb2 and Sb3 are absent. Photoelectric signals delivered from photosensitive regions 17A and 17B are converted into digital signals by A/D converter 40, and are then supplied to CPU 90. Since beam spots Sb1, Sb2 and Sb3 are absent in the retrieving mode, adder 25 delivers a summation signal of a level lower than in the case of the recording or erasing mode. Accordingly, CPU 90 delivers no correction signal to D/A converter 42. Thus, photoelectric signals from photosensitive regions 16A and 16B are supplied to differential amplifier 23 without need for correction, so that a focusing-error signal is delivered from amplifier 23.

In the recording or erasing mode, beam spots Sb2 and Sb3, as well as beam spots Sa2 and Sa3, are formed on photosensitive regions 17A and 17B. Therefore, adder 25 delivers a summation signal of a level higher than in the case of the retrieving mode. The summation signal is applied to CPU 90 through A/D converter 40, and the level of a correction signal is determined by the summation signal, in accordance with ratio data supplied from ROM 44. The correction signal is supplied to adder 24 through D/A converter 42. Since the level of the correction signal is substantially equal to that of a signal produced from beam spot Sb1 in photosensitive region 16B, correction is effected and differential amplifier 23 delivers an accurate focusing-error signal.

The level of the correction signal is determined by CPU 90, on the basis of the summation signal from adder 25, which varies as the reflection factor of the region on the optical disk changes. Thus, CPU 90 can deliver a correction signal of a level accurately equivalent to the intensity level of beam spot Sb1 to effectively cancel the effect of the signal from spot Sb1.

In the circuit arrangement described above, semiconductor lasers 11-1 and 11-2 are not monitored, and the ratio of the retrieving laser beam to the erasing laser beam is constant.

Figure 9:
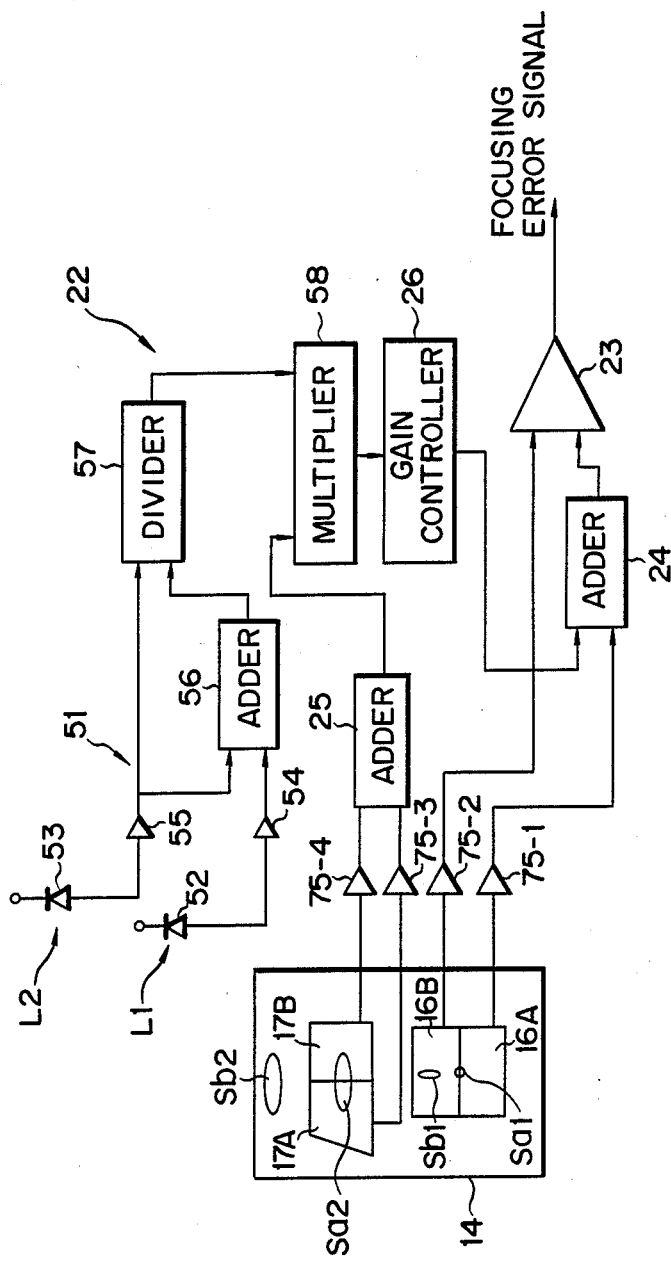
FIGS. 9, 10 and 11 show modifications of the circuit arrangement.
Figure 10:
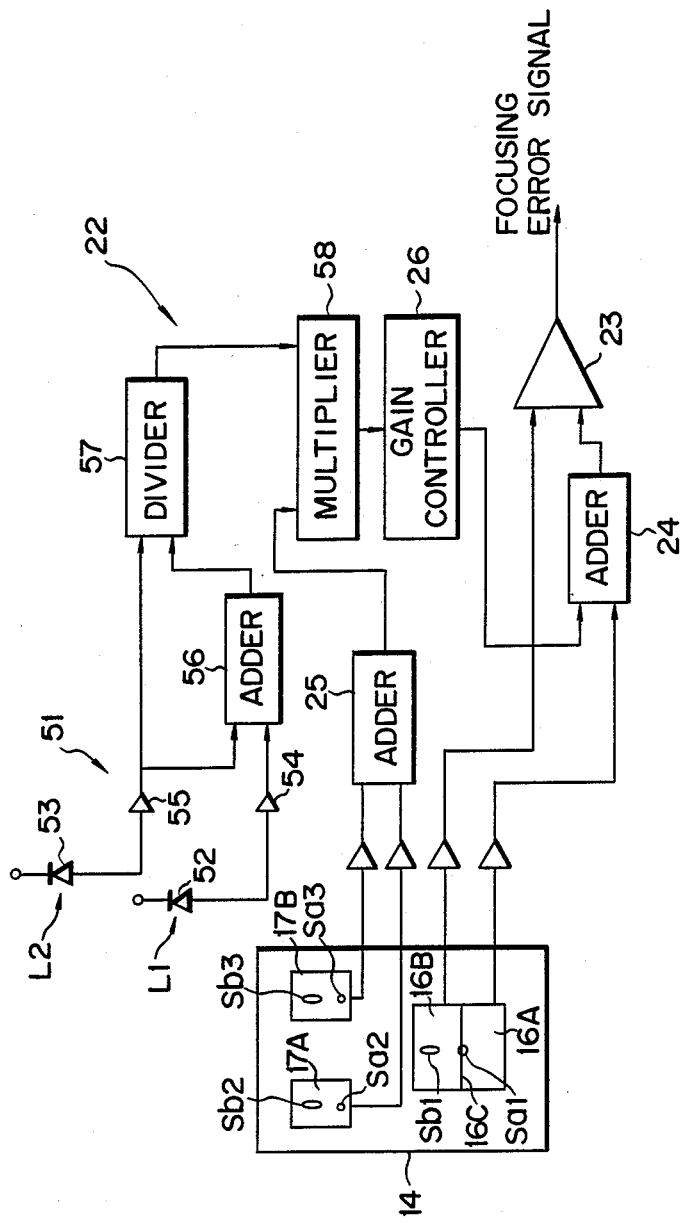

Referring now to FIGS. 9 and 10, alternative circuit arrangements for the means for processing the photoelectric signals received from photodetector 14 will be described in which the correction-signal level is determined by monitoring semiconductor lasers 11-1 and 11-2.

In the circuit arrangement shown in FIG. 9, monitor circuit 51 is added to an arrangement in which photosensitive regions 16A, 16B, 17A and 17B are arranged as shown in FIG. 4, on photodetector 14. In the circuit arrangement shown in FIG. 10, monitor circuit 51 is added to an arrangement in which photosensitive regions 16A, 16B, 17A and 17B are arranged as shown in FIG. 7 and 8, on photodetector 14.

The circuit arrangements of FIGS. 9 and 10 have the same configuration, except for the arrangement of the photosensitive regions. Therefore, the two arrangements will be described at the same time. In general, semiconductor laser array 11 emits laser beams not only toward convex lens 12, but also on the back side of itself. The laser beams emitted at the back of laser array 11 are introduced into photodetectors 52 and 53 located behind the array. Thus, the intensity of retrieving or recording laser beam La and erasing laser beam Lb are detected by photodetectors 52 and 53, respectively, and used as monitor signals. The monitor signals from photodetectors 52 and 53 are amplified by preamplifiers 54 and 55, respectively and then supplied to adder 25, to be added and the resulting signal inputted to divider 57. After it is amplified by preamplifier 55, the photoelectric signal from photodetector 53 is also supplied to divider 57. Divider 57 delivers an output signal equivalent to the ratio of its inputs, Lb/(La+Lb), which is obtained by dividing erasing laser beam Lb intensity by the sum of the intensities (La+Lb) of laser beams La and Lb. A summation output signal, which is equivalent to the sum of the photoelectric signals from photosensitive regions 17A and 17B is added by adder 25, and has a fixed relation to ratio Lb/(La+Lb). The outputs of adder 25 and divider 57 are multiplied by multiplier 58. The output signal from multiplier 58 is converted, by gain controller 26, into a correction signal of a level equivalent to beam spot Sb1. In adder 24, the correction signal is added to the photoelectric signal from photosensitive region 16A which is received through preamplifier 75-1. The output of adder 24 is compared to the photoelectric signal from photosensitive region 16B received through preamplifier 75-2 by differential amplifier 23. Thus, differential amplifier 23 delivers a focusing-error signal which does not include a component signal due to beam spot Sb1.

According to the circuit arrangements shown in FIGS. 9 and 10, laser beams from semiconductor laser array 11 are monitored, so that an accurate correction signal can be obtained in accordance with the monitor signals. Thus, erasing-beam components, introduced into the photodetector for focus detection, can be removed from the focusing-error signal.

Figure 11:
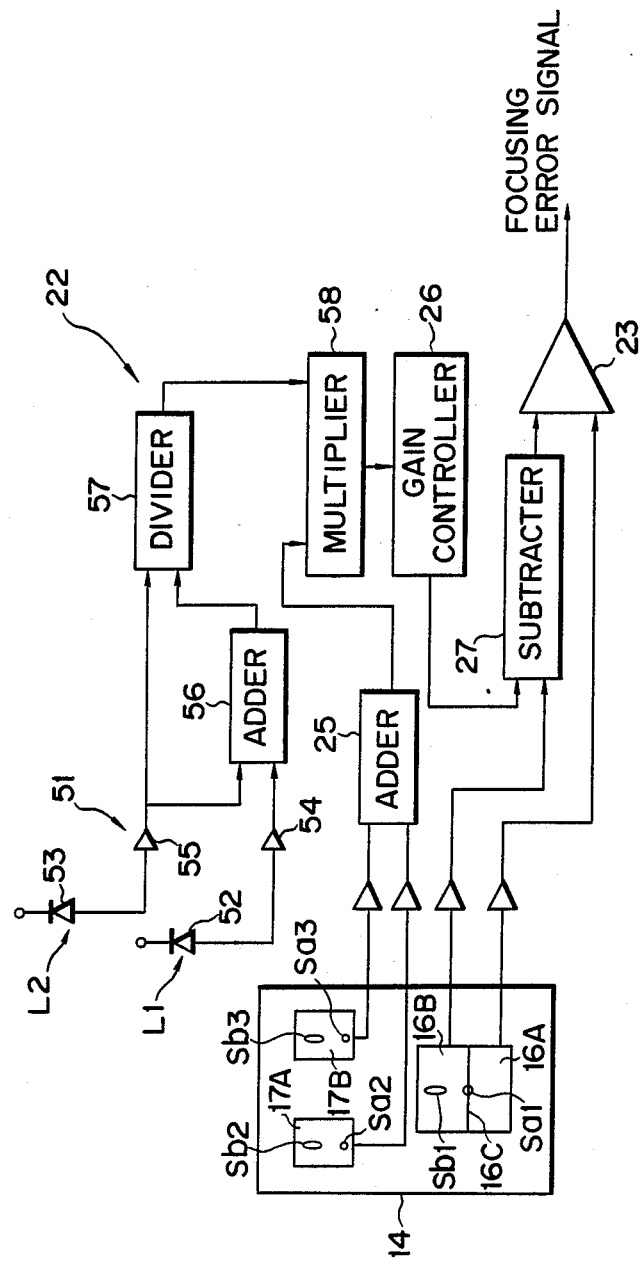

In the circuit arrangement shown in FIGS. 8, 9 and 10, adder 24 is provided for adding the correction signal having a level equivalent to beam spot Sb1, to the photoelectric signal produced by photosensitive region 16A which has no noise corresponding to the beam spot Sb1 on region 16B. Alternatively, as illustrated in FIG. 11, subtractor 27, instead of adder 24, may be arranged between photosensitive region 16B and differential amplifier 23. In the circuit arrangement of FIG. 11, subtractor 27 subtracts the correction signal having a level equivalent to beam spot Sb1 from the photosensitive signal supplied from photosensitive region 16B which has a noise signal corresponding to beam spot Sb1. Subtractor 27 supplies a resultant substaction signal to differential amplifier 23. Thus, differential amplifier 23 generates an accurate focusing-error signal which is free from the influence of beam spot Sb1.

In the above described embodiment, beam spot Sb1 as the noise is formed on one of photosensitive regions 16A, 16B in the recording or erasing mode. However, another beam spot as the noise, in addition to beam spot Sa or beam spots Sa and Sb, may be formed on one of the photosensitive regions 16A and 16B in any mode due to a stray or spurious light beam which is caused by unexpected reflection of light beam in an optical member of the system. In this invention, the noise caused from the stray light beam can be also removed from the focusing-error signal.

In the above described embodiment, there is disclosed the system of write- and read-after-erase type, in which the first and second lasers emit recording or retrieving laser beam La and erasing laser beam Lb, respectively, and the recording or retrieving and erasing laser beam spots Sa1, Sb1 are formed on photosensitive regions 16A, 16B. However, in the present invention, it is not limited to the write- and read-after-erase type system and the present invention can be applied to a system of a read-after-write type, in which the first and second lasers emit a retrieving laser beam La and recording laser beam Lb, respectively, and the recording and retrieving laser beam spots Sa1, Sb1 are formed on photosensitive regions 16A, 16B. Furthermore, the present invention can be applied to a system, in which three or more laser beams are emitted from the semiconductor array 11 and three or more laser beam spots are formed on the photosensitive regions 16A, 16B.

Figure 12:
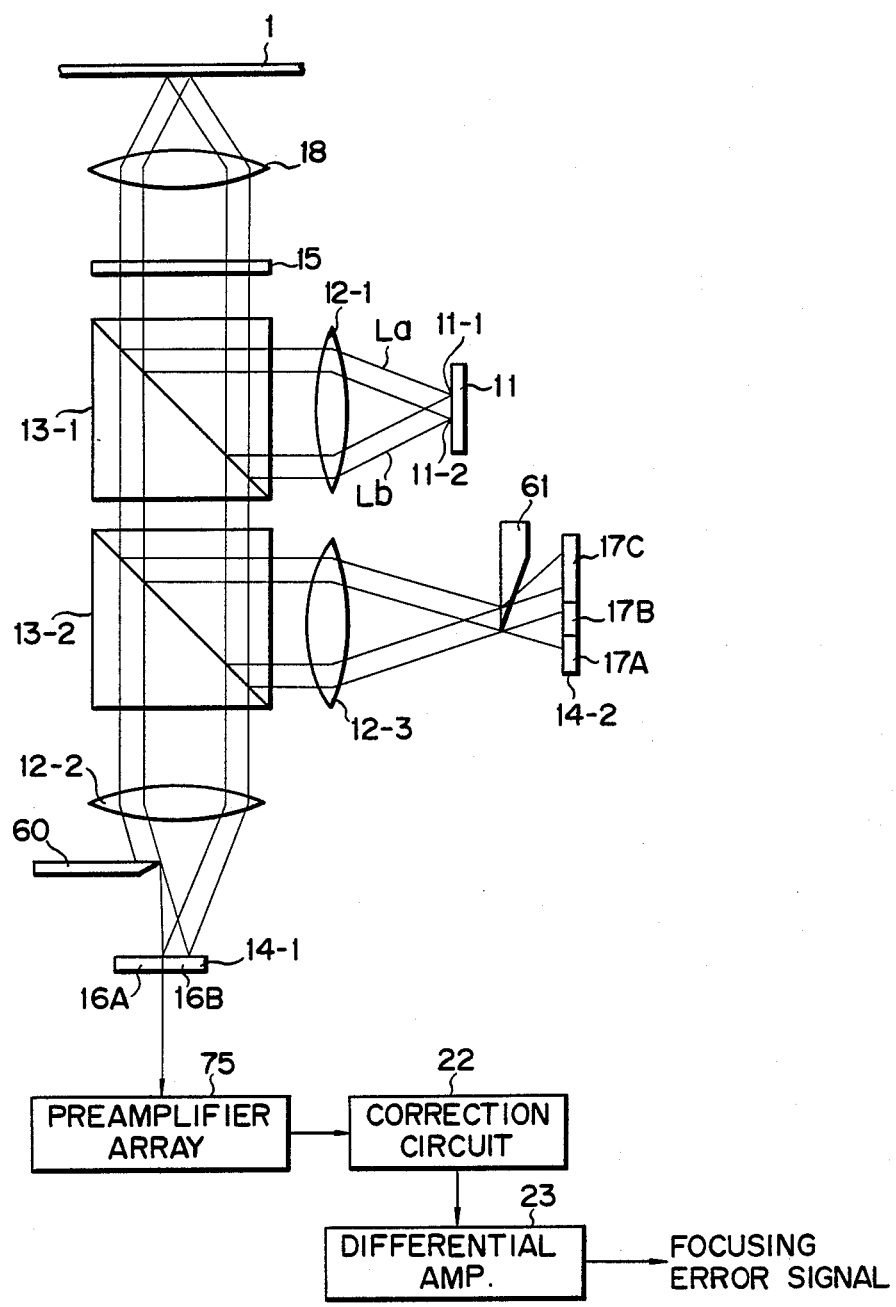
FIG. 12 shows another system of an optical head according to the present invention.

FIG. 12 now will be described in which the present invention is applied to a read-after-write type system. In FIG. 12, like reference numerals are used to indicate the corresponding elements or parts in the above figures. In a read-after-write type system, semiconductor laser 11 generates not only retrieving laser beams but also recording laser beams. The retrieving and recording laser beams are collimated by collimator lens 12-1, and reflected by first beam splitter 13-1 to be incident on objective lens 18. Then, the laser beams are converged on optical disk 1 by objective lens 18. The laser beams reflected by optical disk 1 are transmitted through objective lens 18, quarter-wave plate 15 and first beam splitter 13-1 to second beam splitter 13-2. Second beam splitter 13-2 splits each of the retrieving and recording laser beams into first and second retrieving and recording laser beams which are respectively incident on first and second projection lenses 12-2 and 12-3. The first retrieving and recording laser beam, after passing through second beam splitter 13-2, is converged by first projection lens 12-2. Knife edge 60 picks up part of the first retrieving laser beam, whereby the first recording laser beam and a first retrieving laser beam segment thus picked up fall on photodetector 14-1. In this manner, not only beam spot Sa1 but also beam spot Sb1 are formed on photosensitive regions 16A and 16B, as in the case described with reference to FIGS. 8 to 11. Also in this arrangement, differential amplifier 23 generates an accurate focusing-error signal which is free from the influence of beam spot Sb1, since photosensitive regions 16A and 16B are connected to correction circuit 22 through preamplifier array 75. On the other hand, the second retrieving and recording laser beam, which is reflected by second beam splitter 13-2 to be incident on second projection lens 12-3, is converged by second projection lens 12-3. The second retrieving laser beam is made to fall on photosensitive regions 17A and 17B or second detector 14-2 which are provided for detecting the track guide. Then, the second recording laser beam is refracted by a refractor, such as prism 61, having its tip arranged near the convergent point of the first retrieving laser beam segment. The second recording laser beam, the propagating direction of which has been thus changed, falls on photosensitive region 17C of second photodetector 14-2.

Thus, according to the system of the present invention, the optical system can be simplified, and the influence of noise signals can be eliminated for accurate detection of the focusing state of the objective lens.

What is claimed is:

1. A system for retrieving information from an optical recording medium, comprising:
   means for emitting a first and a second light beams;
   means for converging said first and second light beams onto said optical recording medium, said first and second light beams being reflected from said optical recording medium;
   photodetector means having a plurality of photosensitive regions for receiving said first and second light beams reflected from said optical recording medium and for converting said first and second light beams into first and second photoelectric signals, respectively; and
   means for generating a correction signal corresponding to said second light beam to correct one of said first and second photoelectric signals produced from one of said plurality of photosensitive regions and for generating a control signal based on one of said first and second photoelectric signals and said corrected one of said first and second photoelectric signals.

2. A system according to claim 1, wherein said converging means includes an objective lens movable along an optical axis thereof, said first light beam being focused on said optical recording medium when said objective lens is in a focused state and being unfocused when said objective lens is in an unfocused state, and wherein said control signal is a focusing-error signal.

3. A system according to claim 2, further comprising means for moving said objective lens along said optical axis in response to said focusing error signal so as to maintain said objective lens in said focused state.

4. The system according to claim 3, wherein said converging means includes means, disposed between said objective lens and said photodetector means for deflecting said first and second light beams in accordance with changes in the state of said objective lens, such that said first light beam is directed to a boundary line between a first pair of said plurality of photosensitive regions when said objective lens is in said focused state, and is directed to one of said first pair of said plurality of photosensitive regions when said objective lens is in said defocused state.

5. The system according to claim 3, further comprising first and second energizing signal generating means for supplying a first energizing signal to said emitting means to output only said first light beam and for supplying a second energizing signal to said emitting means to output both said first and second light beams.

6. The system according to claim 5, wherein said first energizing signal generating means includes means for receiving said photoelectric signals from said photosensitive regions while said first energizing signal is being generated, and for generating a difference signal indicative of the difference between said first and second photoelectric signals from respective photosensitive regions, and further comprising switching means connected to said photosensitive regions and said difference signal generating means for disconnecting said photosensitive regions from said difference signal generating means when said second light beam is emitted; and signal holding means for holding the levels of said photoelectric signals supplied to said difference signal generating means.

7. The system according to claim 3, wherein said plurality of photosensitive regions include first, second, third, and fourth photosensitive regions;
wherein said correction signal is generated in response to photoelectric signals from said third and fourth photosensitive regions and is equivalent to the photoelectric signal generated by one of said first and second photosensitive regions in response to said second light beam being incident thereon;
and wherein said generating means includes means for adding said correction signal to a photoelectric signal from the other one of said first and second photosensitive regions, and means for generating, as a focusing-error signal, a difference signal indicative of the difference between the photoelectric signal to which said correction signal is added and the photoelectric signal from said one of said first and second photosensitive regions.

8. The system according to claim 7, wherein said generating means includes means for adding photoelectric signals from said third and fourth photosensitive regions to generate a first summation signal, and means for converting said summation signal into said correction signal.

9. The system according to claim 7, further comprising means for monitoring said first and second light beams and generating respective monitor signals, and wherein said generating means generates said correction signal in response to said monitor signals and said photoelectric signals from said third and fourth photoelectric regions.

10. The system according to claim 9, wherein said monitor signal generating means includes detecting means for detecting and converting said first and second light beams into said first and second monitor signals, respectively, adding means for adding said first and second monitor signals and generating a second summation signal, and means for dividing said second monitor signal by said summation signal and generating a division signal.

11. The system according to claim 10, wherein said generating means includes means for multiplying said first summation signal by said division signal and generating a multiplication signal, and means for converting said multiplication signal into said correction signal.

12. The system according to claim 1, wherein said first laser beam is a retrieving or recording laser beam and said second laser beam is an erasing laser beam.

13. The system according to claim 1, wherein said optical recording medium is an optical disk.

14. The system according to claim 1, wherein said optical recording medium is an optical card.

* * * * *

UNITED STATES PATENT AND TRADEMARK OFFICE
CERTIFICATE OF CORRECTION

PATENT NO.   :   4,890,272

DATED        :   December 26, 1989

INVENTOR(S)  :   Hideo Ando

It is certified that error appears in the above-identified patent and that said Letters Patent is hereby corrected as shown below:

ON THE TITLE PAGE:

In the Foreign Application Priority Data, please delete "Apr. 30, 1986 [JP] Japan ..............61-42915" and insert --Feb. 28, 1986 [JP] Japan .............61-42915--.

Signed and Sealed this

Second Day of June, 1992

*Attest:*

DOUGLAS B. COMER

*Attesting Officer*   Acting Commissioner of Patents and Trademarks